March 8, 1966     E. G. SWETT     3,238,925
COPYHOLDERS
Filed Sept. 14, 1964     8 Sheets-Sheet 1
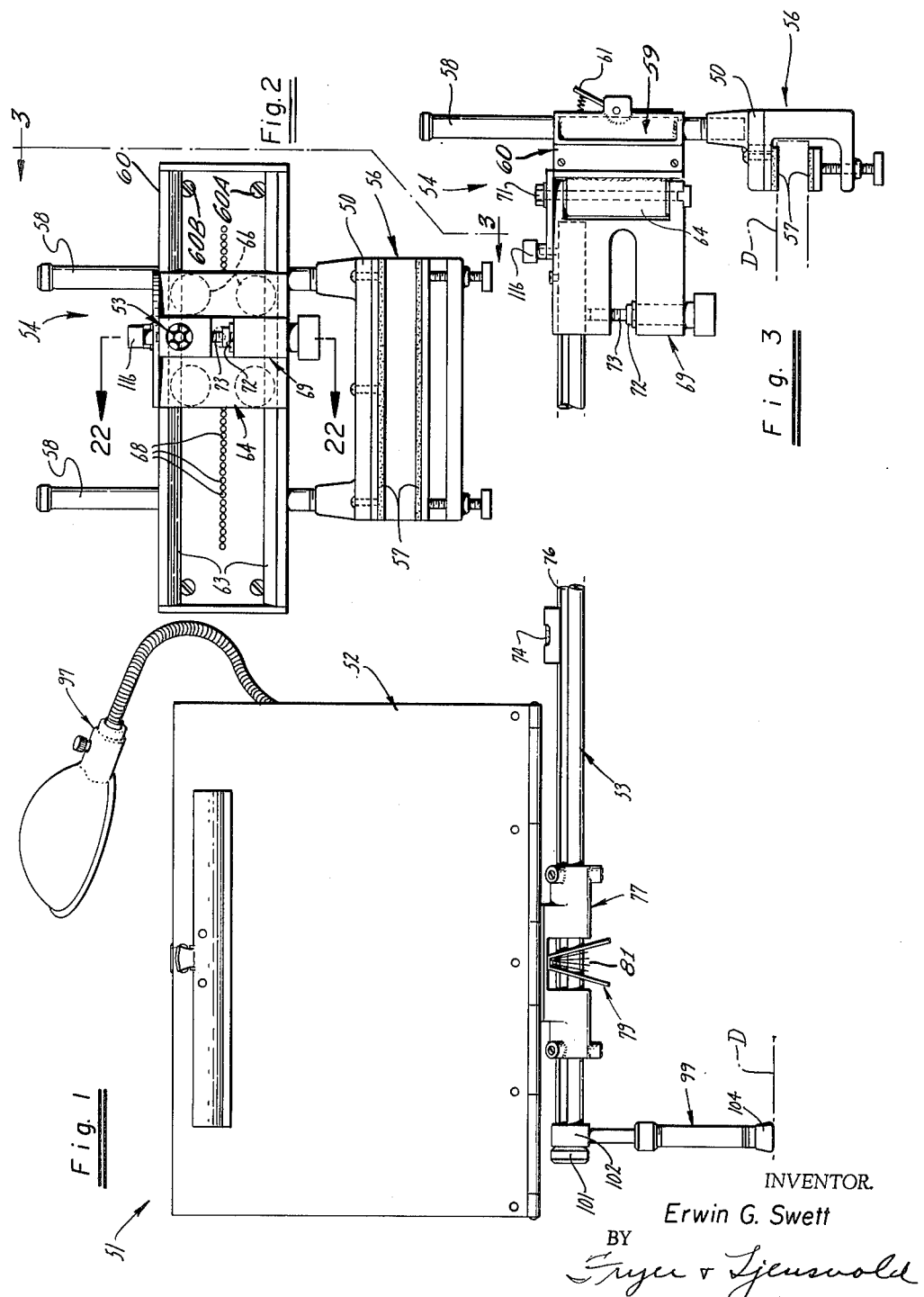
INVENTOR.
Erwin G. Swett
BY
Fryer & Tjensvold
Attorneys

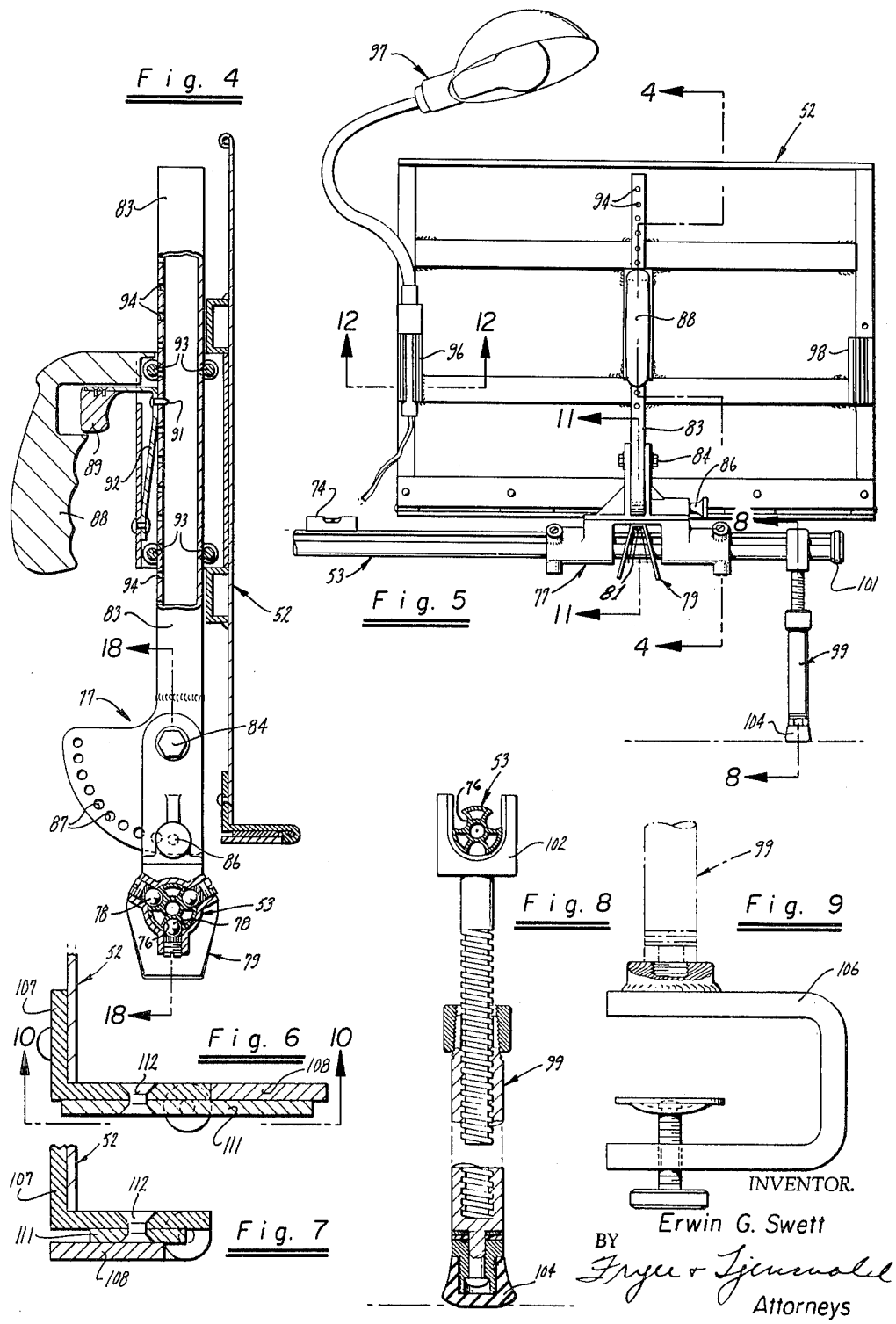

March 8, 1966 E. G. SWETT 3,238,925
COPYHOLDERS
Filed Sept. 14, 1964 8 Sheets-Sheet 3
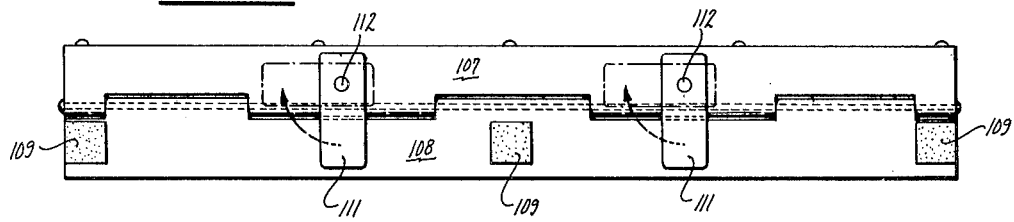
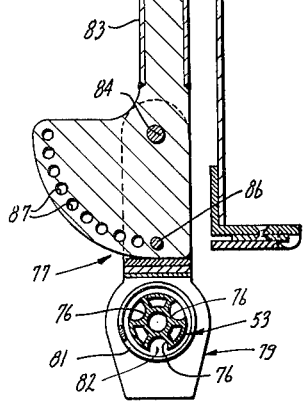
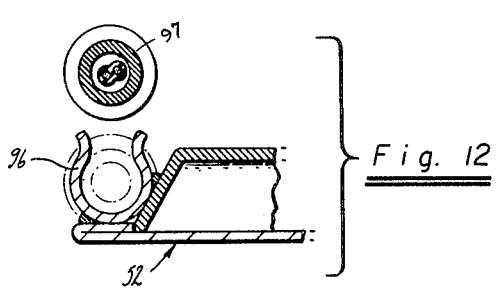
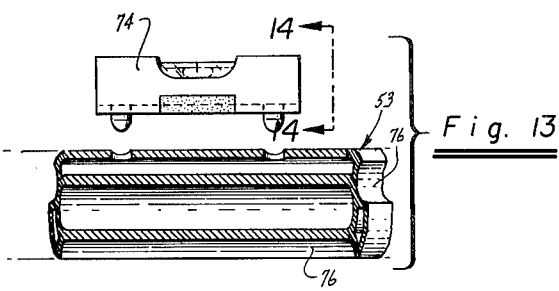
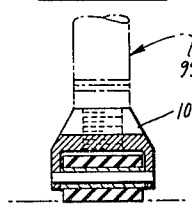
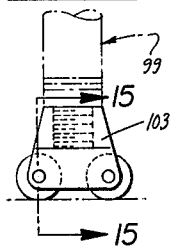
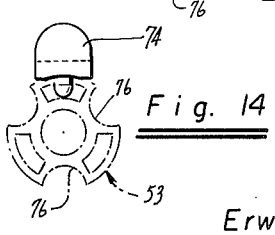
INVENTOR.
Erwin G. Swett
BY
Attorneys March 8, 1966 E. G. SWETT 3,238,925
COPYHOLDERS
Filed Sept. 14, 1964 8 Sheets-Sheet 4

INVENTOR.
Erwin G. Swett
BY
Attorneys

March 8, 1966  E. G. SWETT  3,238,925
COPYHOLDERS
Filed Sept. 14, 1964  8 Sheets-Sheet 5
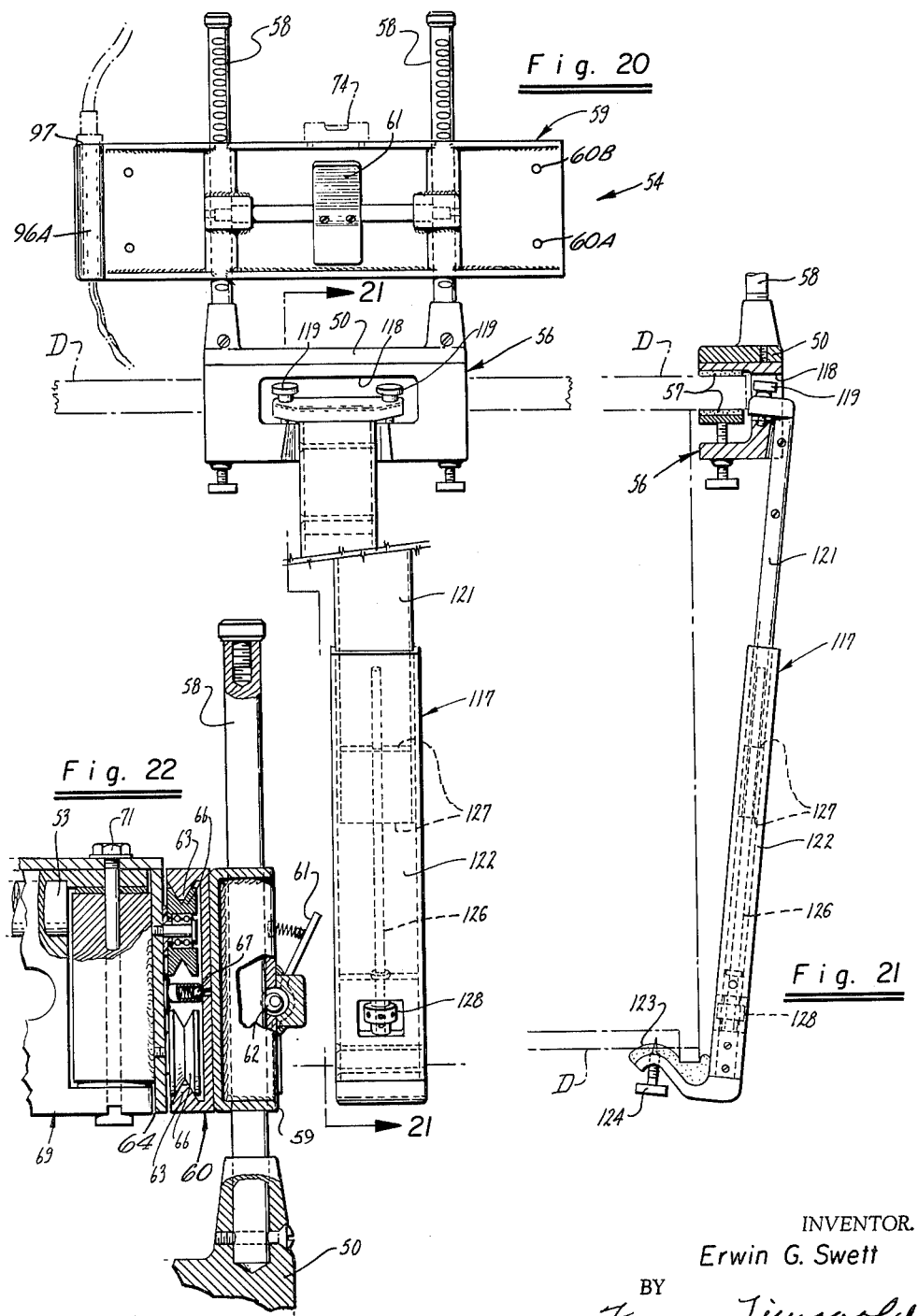
INVENTOR.
Erwin G. Swett
BY
Fryer & Tjensvold
Attorneys

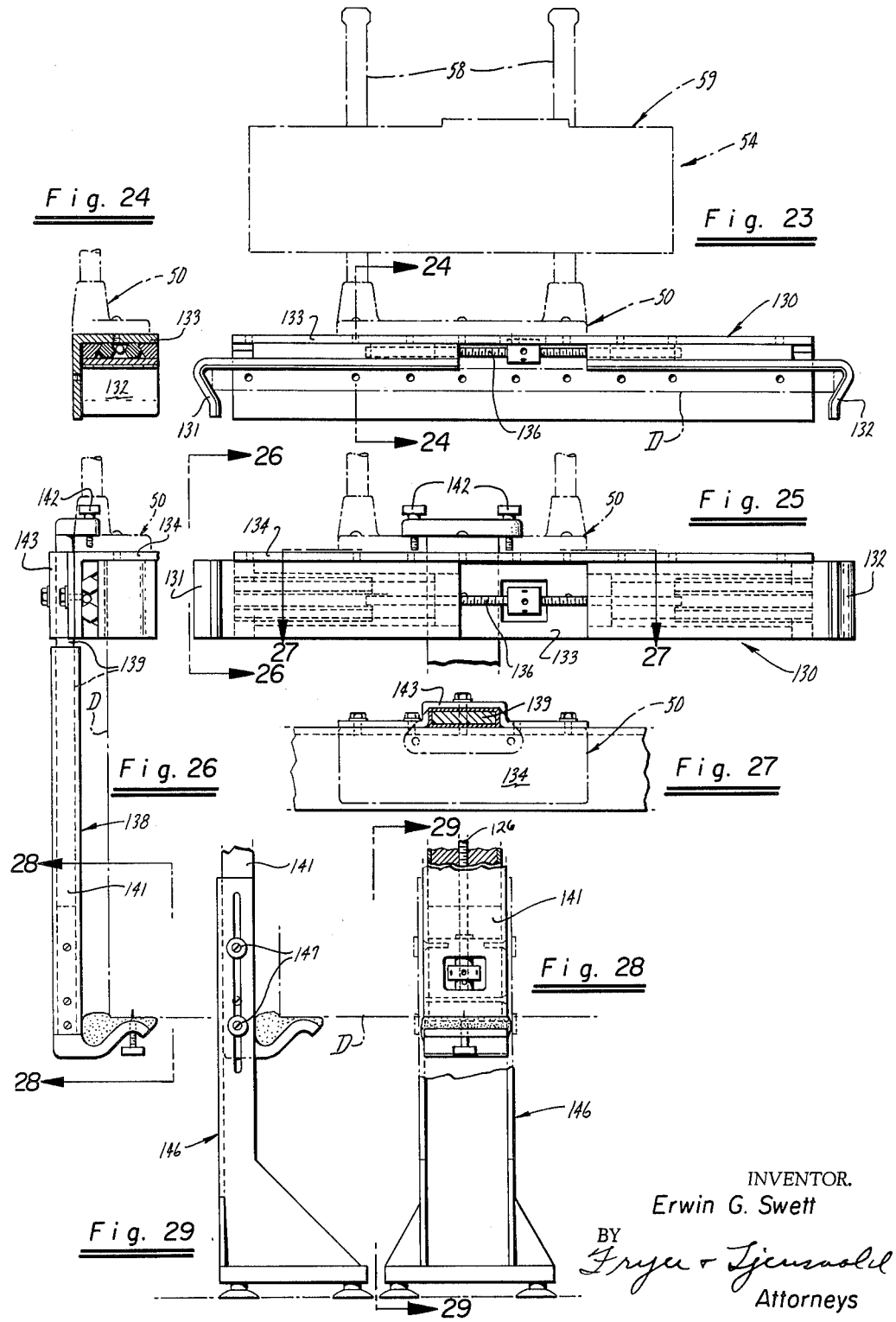

March 8, 1966 E. G. SWETT 3,238,925
COPYHOLDERS
Filed Sept. 14, 1964 8 Sheets-Sheet 7
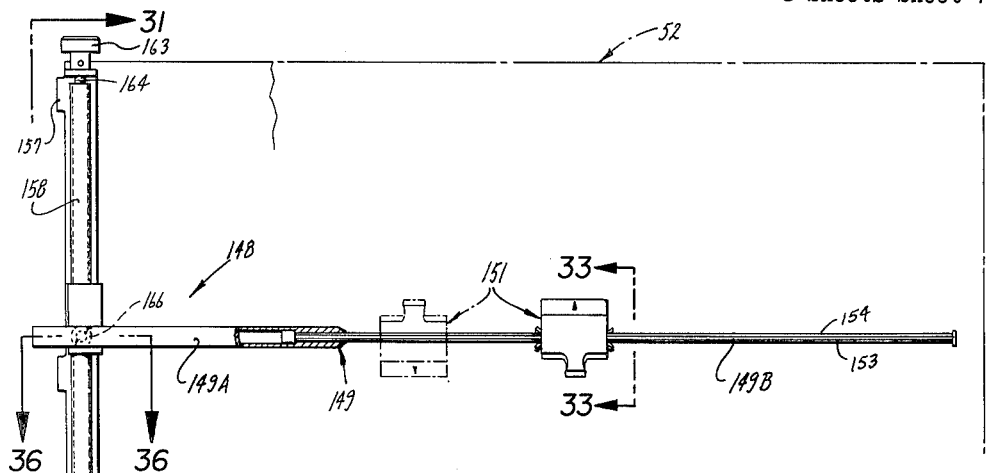
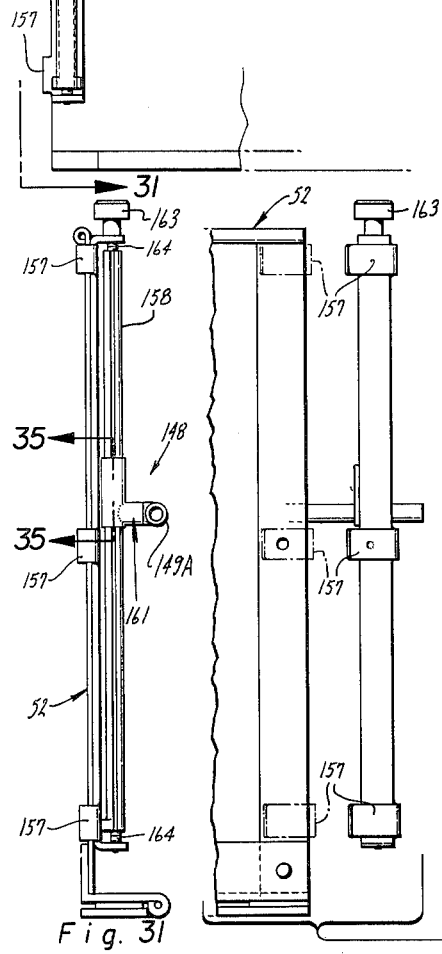
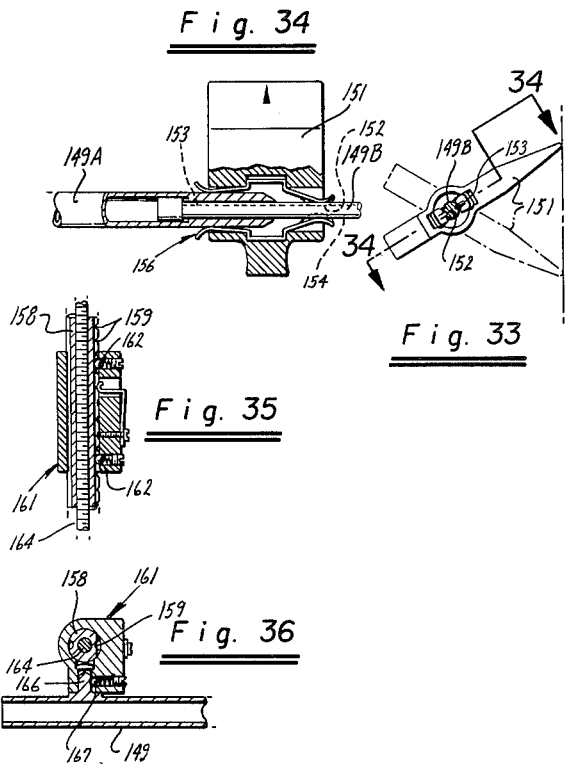
INVENTOR.
Erwin G. Swett
BY
Fryer & Griswold
Attorneys March 8, 1966 E. G. SWETT 3,238,925
COPYHOLDERS
Filed Sept. 14, 1964 8 Sheets-Sheet 8
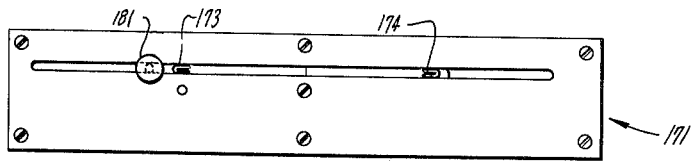
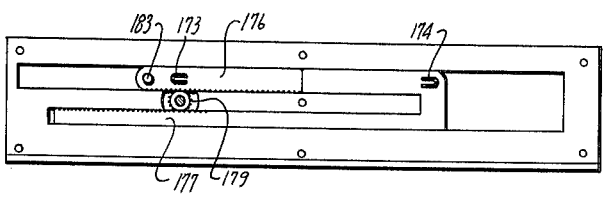
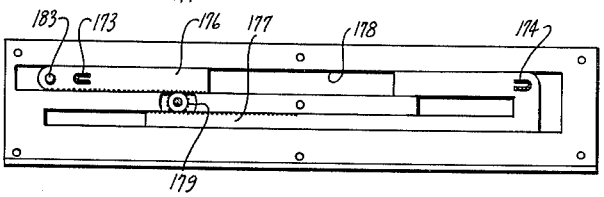
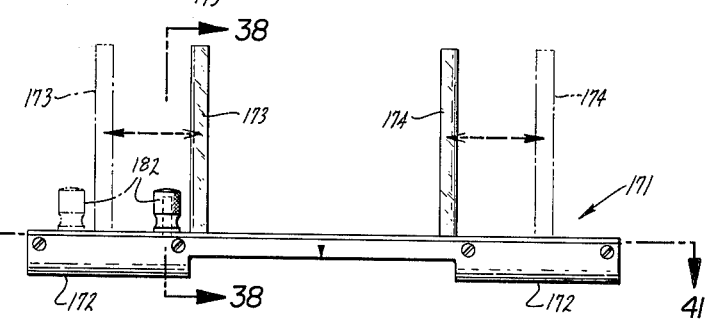
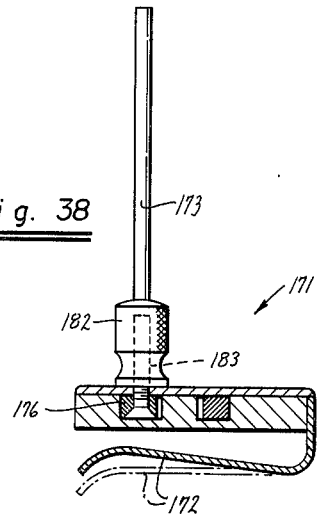
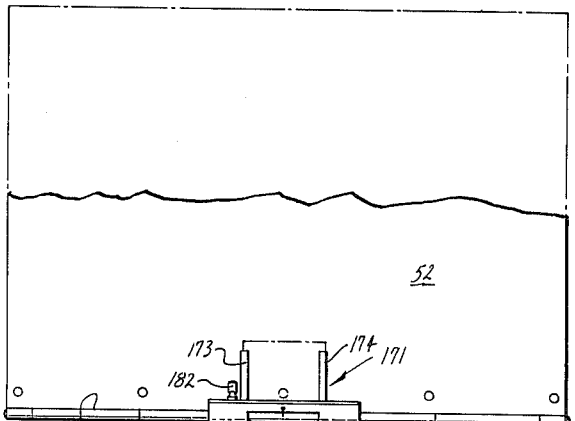
INVENTOR.
Erwin G. Swett
BY
Fryer + Sjensvold
Attorneys United States Patent Office 3,238,925
Patented Mar. 8, 1966

3,238,925
COPYHOLDERS
Erwin G. Swett, 462 22nd Ave., Apt. 6,
San Francisco, Calif.
Filed Sept. 14, 1964, Ser. No. 396,166
12 Claims. (Cl. 120—28)

This invention relates to a copyholder for positioning and retaining papers, books and other written material in a desired location and a desired angle and is an improvement in a copyholder disclosed in my copending application Serial No. 245,046 filed December 17, 1962, now Patent No. 3,200,791. The copyholder of the present invention is particularly well suited for use in offices to hold copy to be transcribed.

The copyholder of the present invention includes a copyboard which is mounted on a swing arm which is in turn pivoted for swinging motion about one end. One of the problems presented by this type of construction is that of sagging of the free end of the swing arm when books or other heavy objects are placed on the copyboard. In accordance with the present invention a detachable support is provided for the free end of the swing arm. The support is adapted to engage and support the underside of the swing arm and includes an adjustment for varying the length of the support. The end of the support which engages the desk is preferably fitted with wheels so that the support can roll freely along the surface of the desk during swinging movement of the swing arm.

The copyholder of the present invention also features a word or place marker which is slidable along a horizontally extending rod for marking the exact place where the typist stopped copying. The word marker is rotatable about the rod to one of two locking angles to mark a location on a line of copy from above or below the line in accordance with the personal preference of the typist.

Another feature of the present invention is a removable and adjustable index card holder. The card holder includes a pair of grooved members which are adapted to receive opposite side edges of a card. The groove members are mounted on an adjustable gear rack which permits adjustment of the space between the groove members to accommodate cards of different size. The card holder also incorporates a spring clip which permits the card holder to be readily attached to or detached from the copyboard.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a front elevation view of a copyholder constructed in accordance with one embodiment of the present invention;

FIG. 2 is an end elevation view of a desk clamp for the copyholder shown in FIG. 1;

FIG. 3 is an elevation view of the desk clamp shown in FIG. 2 taken along the line and in the direction indicated by the arrows 3—3 in FIG. 2;

FIG. 4 is an elevation view, partly broken away in parts, of structure for adjusting the vertical position of the copyboard shown in FIG. 1 taken along the broken line and in the direction indicated by the arrows 4—4 in FIG. 5;

FIG. 5 is a rear elevation view of the copyholder shown in FIG. 1;

FIG. 6 is a fragmentary sectional view showing details of an extendable ledge in a fully extended position;

FIG. 7 is a view like FIG. 6 but showing the ledge in a folded back position;

FIG. 8 is an elevation view partly broken away of the support for the swing arm taken along the line and in the direction indicated by the arrows 8—8 in FIG. 5;

FIG. 9 is an elevation view of a clamp attachment which can be fitted on the lower end of the support shown in FIG. 8;

FIG. 10 is a bottom plan view of the extendable support ledge shown in FIG. 6;

FIG. 11 is an elevation view taken along the line and in the direction indicated by the arrows 11—11 in FIG. 5;

FIG. 12 is a fragmentary plan view taken along the line and in the direction indicated by the arrows 12—12 in FIG. 5 showing details of a clip for holding a lamp;

FIG. 13 is a fragmentary enlarged view, partly broken away, showing details of the mounting of a spirit level for the swing arm of the copyholder shown in FIG. 1;

FIG. 14 is a fragmentary end elevation view taken along the line and in the direction indicated by the arrows 14—14 in FIG. 13;

FIG. 15 is a fragmentary elevation view, taken along the line and in the direction indicated by the arrows 15—15 in FIG. 16, of a wheel attachment for the support shown in FIG. 8;

FIG. 16 is an elevation view of the attachment shown in FIG. 15;

FIG. 20 is an elevation view of an auxiliary clamp for the desk clamp shown in FIG. 2;

FIG. 21 is an elevational view taken along the line and in the direction indicated by the arrows 21—21 in FIG. 20;

FIG. 22 is an elevation view taken along the line and in the direction indicated by the arrows 22—22 in FIG. 2;

FIG. 23 is an elevation view of a desk mounting stand for the copyholder shown in FIGS. 1 and 3;

FIG. 24 is an elevation view taken along the line and in the direction indicated by the arrows 24—24 in FIG. 23;

FIG. 25 is an elevation view of a modified form of the desk clamp shown in FIG. 23, modified to permit mounting at the end of a desk;

FIG. 26 is an elevation view taken along the line and in the direction indicated by the arrows 26—26 in FIG. 25;

FIG. 27 is a fragmentary plan view taken along the line and in the direction indicated by the arrows 27—27 in FIG. 25;

FIG. 28 is a fragmentary elevation view taken along the line and in the direction indicated by the arrows 28—28 in FIG. 26;

FIG. 29 is an elevation view taken along the line and in the direction indicated by the arrows 29—29 in FIG. 28;

FIG. 30 is a front elevation view of a word marker for the copyholder shown in FIG. 1;

FIG. 31 is an elevation view of the word marker shown in FIG. 30 taken along the line and in the direction indicated by the arrows 31—31 in FIG. 30;

FIG. 32 is a fragmentary rear elevation view of the word marker shown in FIG. 30 showing the manner in which the word marker is detachably clipped to the copyboard;

FIG. 33 is an elevation view of a slidable marker taken along the line and in the direction indicated by the arrows 33—33 in FIG. 30;

FIG. 24 is a plan view taken along the line and in the direction indicated by the arrows 34—34 in FIG. 33;

FIG. 35 is an elevation view taken along the line and in the direction indicated by the arrows 35—35 in FIG. 31 showing details of the ball and detent arrangement which permits vertical positioning of the word marker of FIG. 30;

FIG. 36 is a plan view taken along the line and in the direction indicated by the arrows 36—36 in FIG. 30;

FIG. 37 is a front elevation view of a card holder clipped in position on the copyholder;

FIG. 38 is an end elevation view of the card holder shown in FIG. 37 and taken along the line and in the direction indicated by the arrows 38—38 in FIG. 39;

FIG. 39 is an enlarged front elevation view of the card holder shown in FIG. 37;

FIG. 40 is a bottom plan view of the card holder shown in FIG. 39;

FIG. 41 is a top plan view of the card holder shown in FIG. 39, showing the position of the parts in one position of adjustment of the card holder; and FIG. 42 is a top plan view of the card holder shown in FIG. 39 showing the card edge retaining means in a second adjusted position.

Figure 17:
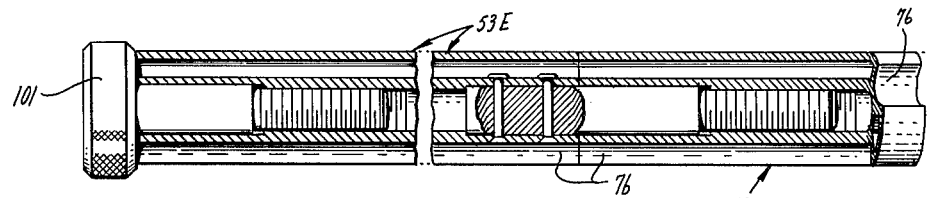
FIG. 17 is an elevation view, partly broken away, showing details of the manner of connecting an extension to the swing arm of the copyholder shown in FIG. 1.

In FIG. 1 a copyholder constructed in accordance with one embodiment of the present invention is indicated generally by the reference numeral 51. The copyholder 51 is generally similar to that described in my copending U.S. application Serial No. 245,046 filed December 17, 1962, now Patent No. 3,200,791, in that it includes a board 52 which is axially movable along a swing arm 53. The swing arm 53 is mounted for swinging movement in a horizontal direction by a hinge connection at one end to a main support assembly indicated generally by the reference numeral 54.

The main support assembly 54 is preferably adapted to be mounted on the projecting edge of a desk D, as indicated by the phantom lines in FIG. 3, by C clamp arrangement indicated by the reference numeral 56. The desk engaging surfaces of the C clamp are provided with resilient strips 57.

A pair of uprights 58 are attached at their lower ends to a base plate 50 mounted on the C clamp 56 and a member 59 is movable vertically on the uprights (see FIGS. 20 and 3). As best shown in FIG. 22, the member 59 is provided with a spring biased lever 61 which can be depressed against the spring to rotate cams 62 out of engagement with the uprights 58 (also see FIG. 20) and thus permit vertical adjustment of the member 59. When the lever 61 is released, the spring rotates the cams 62 back into engagement with the uprights 58 to hold the member 59 in the new position. Note that the member 59 is an elongated C-shaped channel which abuts the back (closed part) of the oblong boxlike member 60. The front (open part) of the member 60 has formed therein a pair of horizontally extending rails 63. FIGS. 20 and 22 as well as 2 and 3 illustrate that the abutting member 59 is attached to the member 60. Also illustrated is the way both members 59 and 60 are attached by machine screws 60a fitted into the holes 60b.

Another member 64 has four flanged wheels 66 mounted for rotation on axles attached to the member 64. The flanges of the wheels 66 engage the rails 63, as best illustrated in FIGS. 2 and 22, to permit movement of the member 64 horizontally along the member 60. A ball 67 is resiliently biased into engagement with one of a series of detent holds 68 (see FIG. 2) to hold the member 64, and thus the swing arm 53 as will be described, in a selected horizontal location along the member 60.

The swing arm 53 is mounted at one end in a sag adjusting part 69 which is in turn connected by a bolt 71 to the member 64 in a hinge joint connection. The part 69 includes a forked construction as best illustrated in FIG. 3. An internally threaded washer 72 abuts the lower fork of the part 69 and can be turned down on the screw 73 (which is threaded into the upper fork but which is freely movable within the lower fork) to spread the forks and compensate for sagging of the swing arm. Thus, on rotation of the washer 72, the forks of the part 69 can be spread apart to permit the swing arm 53 to be levelled by a detachably mounted spirit level 74 (see FIG. 13). The spirit level 74 can also be used to level the main support assembly 54, especially when it is mounted on a wall W (see FIGS. 20 and 19).

Figure 18:
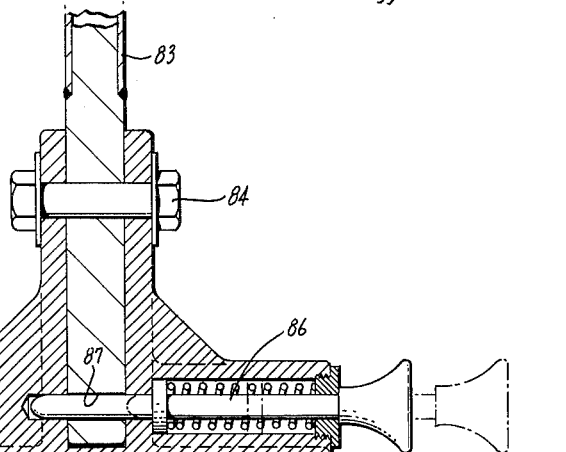
FIG. 18 is an elevation view taken along the line and in the direction indicated by the arrows 18—18 in FIG. 4 showing details of structure for adjusting the tilt of the copyboard.

The swing arm is formed with three axially extending grooves 76 (see the cross section views of the swing arm in FIGS. 4 and 8). A board support fixture 77 encircles the swing arm 53 and mounts balls 78 which are rollable along the guideways formed by the groove 76 to permit axial movement of the support fixture 77 along the swing arm 53 while preventing any rotation of the support fixture with respect to the swing arm 53. As best shown in FIG. 18, the support fixture 77 includes a clamp 79 having two legs resiliently biased apart by a coil spring 81. Both legs thus bind the underside of the swing arm. Each leg of the clamp 79 is formed with an elliptically shaped opening which permits the legs, when pressed together, to be moved freely along the swing arm 53 without contacting the underside of the swing arm. When, however, the clamp 79 is released, the spring 81 biases each of the two binding legs to a position where an upwardly projecting tongue 82 (one on each leg) engages the lower groove 76 to help hold the support fixture 77 more securely in the adjusted location.

It is desirable that both the vertical position and the angular inclination of the board 52 be readily adjustable. In accordance with the present invention a single upright 83 is pin-jointed to the support fixture 77 by a bolt 84 (see FIGS. 4, 11 and 18). Angular movement of the upright 83 about the bolt 84 as a pivot is controlled by a spring biased pin 86 which is releasably engageable with any one of a series of holes 87 formed in a flanged lower portion of the upright 83. The angular inclination of the upright 83, and thus of the board 52, can be readily selected by positioning the pin 86 in the aperture 87 which most closely corresponds to the inclination desired.

The vertical position of the board 52 is just as simply selected by grasping a pistol grip shaped handle 88 (see FIG. 4), squeezing a trigger 89 to retract a pin 91 against the bias provided by a leaf spring 92. Rollers 93, mounted in an enclosure on the back of the board 52 then permit the board to be moved axially along the upright 83 to the desired height. The upright is formed with a series of vertically spaced apertures 94, and the trigger 89 can be released to permit the pin 91 to lock with the aperture 94 nearest that height.

As shown in FIGS. 5 and 12, the back of the board 52 is provided with a clip 96 for holding the base of a lamp 97. A similar clip 96a is also provided at one end of the member 59 or 60 (see FIG. 20). Thus the lamp 97 can be positioned in two different locations. The opposite side edge of the back of the board 52 is also provided with a clip 98 for detachably storing a monopod support 99 described in detail below.

Although the sag adjusting member 69 described above permits some correction to be made for leveling the swing arm 53, heavy objects such as books and the like can overload the copyholder when the board is positioned near the outer end of the swing arm 53. In accordance with the present invention a monopod support 99 can be attached to the swing arm by unthreading a knurled end piece 101 (see FIG. 17) and slipping the upper end of the adjustable monopod onto the swing arm 53. The monopod 99 is formed in two parts which are adjustably threaded together as best shown in FIG. 8 to permit adjustment of the height of the monopod.

As illustrated in FIG. 8, the upper part of the monopod 99 may be formed with a U-shaped member 102 for cradling the underside of the swing arm 53 without removing the end piece 101. The lower portion of the monopod 99 is preferably fitted with rollers 103 as shown in FIGS. 15 and 16. However, a fixed tip 104 can be used as illustrated in FIG. 8, or the lower end of the monopod 99 can be threaded to a C clamp 106 as shown in FIG. 9.

Another feature of the present invention is the provision of a fold-out ledge, as shown in FIGS. 6, 7 and 10, for carrying unusually large copy. A generally L-shaped piece 107 is suitably attached to the lower edge of the board 52 to provide a horizontally projecting ledge. A second part 108 is hinged to the outwardly projecting edge of the part 107 and is normally retained in a folded back position by magnets 109 (see FIG. 10) connected to the underside of the part 108. When the part 108 is swung out to the folded out position illustrated in FIGS. 6 and 7 braces 111 are swung about pivot rivets 112 to a supporting position as illustrated in FIGS. 6 and 10.

As illustrated in FIG. 17, the swing arm 53 may be extended in length by screwing in an extension 53E. The swing arm itself can be sectioned into short extensions thus permitting it to be readily shortened as well as lengthened to required dimensions. Usually the extension 53E will not have to be supported at its free end when used to increase the length of the swing arm 53. But when an unusually long swing arm is required, the extension 53E may have to be propped up by the monopod 99 (see FIGS. 1, 5 and 8).

Figure 19:
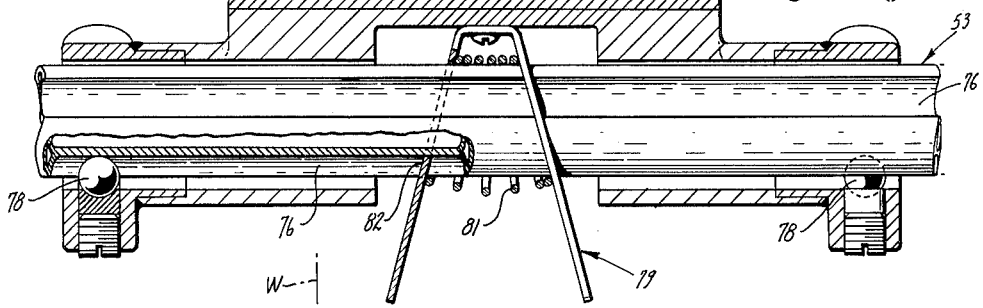
FIG. 19 is a plan view of a wall mounting attachment for the copyholder shown in FIGS. 1 and 3.

FIG. 19 illustrates a wall mounting modification of the main support assembly 54. The desk or C clamp 56, the base plate 50, the pair of uprights 58, and the C-shaped channel 59 are not used in the wall mounting modification shown in FIG. 19 but some of these parts are shown in phantom outline in FIG. 19 to show the relative position of the parts in plan view. The horizontally extending guide member 60 is the same in both forms, and the swing arm 53 is movable along the guide member 60 in the same manner as described in detail with reference to FIG. 22. Wood screws 113 inserted through holes 60b (see FIGS. 2 and 20) mount the member 60 directly to the wall W.

FIG. 19 illustrates the arcuate slot 114 formed in a horizontally extending upper flange portion of the part 60 and the set screw 116 which permits the angular position of the part 69 and the swing arm 53 to be locked at any desired angle with respect to the guide member 60.

In some cases it may be desirable to attach the copyholder 51 to the desk more rigidly than can be achieved by the C clamp alone. The present invention provides an adjustable clamp which can be combined with the C clamp 56 described above to furnish additional support by gripping the underside of the desk.

This clamp is illustrated in FIGS. 20 and 21 and is indicated generally by the reference numeral 117. The depending bracket portion of the C clamp 56 is formed with a central opening 118. The lower surface of the opening 118 is formed with a pair of depressions which receive the ends of screws 119. The screws 119 are carried within an upper end of an upper part 121 which is telescopingly mounted in a lower part 122. The part 122 has the lower end formed to engage the underside of the desk D as best illustrated in FIG. 21. A pad of resilient material 123 may be carried by this lower end to prevent marring of the outer surface of the desk and also to cushion the mounting. A pointed screw 124 may also be threaded within this lower end for engaging the underside of the desk to prevent any slipping of the clamp.

As best illustrated in FIG. 20, the parts 121 and 122 may be adjusted with respect to one another by turning a threaded rod 126. The rod 126 is freely rotatable within the part 122, but is threaded through a block 127 fixed in position within the part 121. The rod 126 can be conveniently rotated by inserting a lever in holes formed in a block 128 which is disposed at one end of the rod 126 in an access opening at the lower end of the part 122. After the clamp 117 is placed in position, the rod 126 can be rotated to clamp the upper and lower parts 121 and 122, respectively, into firm engagement with the clamp 56 and the under side of the desk. The copyholder is thereby attached quite rigidly to the desk D.

In some cases it will not be possible or convenient to mount the copyholder on a projecting ledge of a desk. In FIGS. 23 through 29 there is illustrated another form of a desk clamp which can be used with the main support assembly 54 shown in FIG. 3 in place of the C clamp 56. The clamp shown in these figures of the drawing is adapted to grip the desk either from the top or from the side.

In FIG. 23 the disposition of the parts is such that the adjustable clamping members 131 and 132 are disposed to extend along the upper surface of the desk, while the modification shown in FIG. 25 illustrates the disposition of the parts in which the clamping members 131 and 132 extend along the side of the desk. The mechanism of the clamp itself is the same in either case; the only difference being that in the FIG. 23 form the base plate 50 is attached to a leg 133 of a right-angled bracket, while in the modification shown in FIG. 25, the base plate 50 is attached to leg 134 of the bracket. In the FIG. 25 form the leg of the right-angled bracket which is not attached to the base plate lies flat against the top surface of the desk along the width of the desk to prevent rocking of the copyholder about a horizontally extending axis. The clamping elements 131 and 132 are adjustably positionable within the right-angled bracket by rotation of the rod 136. This rod is oppositely threaded within adjacent ends of the clamping elements so that rotation of the rod 136 moves the clamping elements 131 and 132 in opposite directions. The clamping elements 131 and 132 grip the front and back edges of the desk to prevent rocking of the copyholder about a vertical axis.

In this modification, as in the C clamp 56 described above, it may be desirable to give the clamp additional support by an auxiliary vertically extending clamp which engages the underside of the desk. An auxiliary clamp for this purpose is indicated generally by the reference numeral 138 in FIG. 26. The auxiliary clamp 138 comprises an upper part 139 which is telescopingly mounted within a lower part 141. The part 139 is formed with an upper end having screws 142 for attaching the part 139 directly to the base plate 50. The part 139 also extends through a bracket 143 attached to one of the legs 133 or 134 of the right-angled frame shown in FIG. 26 and is formed to engage the underside of the desk. As best shown in FIG. 27, this construction provides a rigid connection between the auxiliary clamp 138 and the desk clamp 130. The auxiliary clamp 138 secures the right-angled bracket and the clamping elements 131 and 132 in a position where they can perform the function of preventing rocking of the copyholder. The parts 139 and 141 are adjustable in the same manner as the corresponding parts 121 and 122 described above in relation to FIG. 21 (see FIG. 28 showing the adjustable rod 126).

FIGS. 28 and 29 illustrate a further modification of the auxiliary clamp 138 in which a floor support piece 146 is attached to the part 141 by screws 147. The floor support piece 146 includes suction cups which are engageable with the floor for preventing any shifting of the copyholder and desk or table to which the copyholder is attached. This is especially useful in stabilizing light desks and tables on casters.

Referring now to FIGS. 30 through 36, there is illustrated a place marker for marking a location along a line of copy. The place marker is indicated generally by the reference numeral 148. The place marker 148 includes a horizontally extending rod 149 composed of two telescoping sections 149A and 149B which permit the rod to be extended or contracted to accommodate different width lines of type. A marker 151 is slidable axially along the horizontal rod and is rotatable to one of two locking angles, as illustrated in FIGS. 30 and 33, where a guide element 152 is engageable in a complementary axially extending groove 153 or 154 to mark the location from below a line or from above a line. As best illustrated in FIG. 34, the marker 151 includes a spring clip assembly 156 which accommodates the different diameters of the two sections 149A and 149B of rod 149.

As best illustrated in FIG. 32, the entire place marker is detachably mountable on the board 52 by a number of spring clips 157. The place marker 148 includes vertical positioning means in the form of a vertically extending rod 158 formed with a series of detents 159 (see FIG. 35). As is illustrated in FIGS. 30 and 31, a tubular member 161 carries the rod section 149A and encircles the rod 158. Spring biased balls 162 (see FIG. 35) carried within the tubular member 161 releasably engage the detents 159 to permit the tubular member 161 and horizontally extending rod 149 to be positioned vertically in accordance with the line spacing of the material to be copied.

The place marker 148 also includes an adjustment knob 163 attached to a rod 164 (see FIG. 30) threaded within the rod 158 (see FIG. 35) for bringing the entire assembly into initial alignment with the lines of the copy to be transcribed.

It is not necessary to remove the place marker 148 from the board 52 when the place marker is not needed. In such a case, as best illustrated in FIG. 36, the rod section 158 can be rotated through 90 degrees, about a pivot 166 extending within the member 161, to a position in which the spring biased ball 167 engages a detent in the stub shaft 166 to hold the horizontally extending rod 149 out of the field of view of the copy to be transcribed.

The present invention also provides a card holder 171 (see FIG. 37) which can be detachably clipped to the lower ledge 107 of the board 52 by means of a spring clip 172 (see FIG. 38). The card holder 171 includes card edge retaining means 173 and 174 having grooves (see FIG. 42) for receiving opposite side edges of the card. As best illustrated in FIGS. 41 and 42, the card edge retaining means 173 and 174 are mounted on respective gear racks 176 and 177 movable within a guideway 178 in response to rotation of a gear 179. Rotation of the gear 179 in one direction by knob 181 (see FIG. 40) moves the card edge retaining means 173 and 174 closer together as is demonstrated in FIG. 39. Conversely, rotation of the gear 179 in the opposite direction spreads them apart. As is best shown in FIG. 38, a clamping nut 182 is threaded on an upstanding stud 183 fixed to the gear rack 176, and when tightened, holds the gear racks and card edge retaining means in a fixed adjusted position.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In combination with a copyholder of the kind in which a copyboard is mounted on a swing arm pivoted for a swinging motion about one end, a support for the other end of the swing arm having an upper end adapted to engage and support the underside of the swing arm and including adjustable means for varying the length of the support and wheel means detachably mounted at the other end of the support whereby the support is freely rollable along the surface of the desk during swinging movement of the swing arm.

2. A copyholder comprising, a swing arm mounted for swinging movement in a horizontal direction about one end of the arm, a copyboard, and a support fixture mounting the board for axial movement along the swing arm, said swing arm and support fixture having cooperating groove and roller means for holding the support fixture in a fixed angular position on the swing arm.

3. A copyholder as defined in claim 2 including spring biased clamp means coacting with the groove means in the swing arm for holding the support fixture in a selected location on the swing arm.

4. A copyholder as defined in claim 2 wherein the support fixture has a vertically extending member and the copyboard has roller means engaged with and movable axially along with the vertical member and including releasable pin and detent means for adjusting the vertical position of the copyboard on said fixture.

5. A copyboard having an extendable support ledge comprising, a first support member attached to the lower edge of the board, a second support member hinged to the outer edge of the first member for extending the width of the support ledge when swung out to a support position, a brace pivotally connected to the underside of the first member and swingable to a bracing position beneath the second support member, and magnetic clip means for retaining the second support member in a folded back position.

6. A copyholder comprising a copyboard, a swing arm for holding the copyboard and horizontally adjustable mounting means for the swing arm, said mounting means comprising a pair of spaced uprights, a first horizontally extending guide member formed with rail means, a second member mounting flanged wheels engaged with and rollable along said rail means, detent means for holding the second guide member at any one of a series of locations along the first guide member, and a third member connected to the second member by a hinge connection and attached to the swing arm.

7. A copyholder as defined in claim 6 including clamp means associated with the first member for clamping the mounting means at a selected position on the uprights.

8. In combination with a copyholder of the kind in which a copyboard is mounted on a swing arm pivoted for swinging motion in a horizontal direction about one end of the swing arm, means for correcting sagging of the swing arm from a horizontal plane, said means comprising a first member formed with upper and lower forks extending from one side thereof and connected at an opposite side to a hinge joint, said upper fork mounting an end of the swing arm therein, and screw means for spreading the forks apart in a vertical direction to control the angular inclination of the upper fork and the swing arm mounted therein to compensate for sagging of the swing arm under the load of copy on the board.

9. A copyholder as defined in claim 2 including an extension constructed like the swing arm and attachment means for attaching the extension to the swing arm, said attachment means making it possible to extend the swing arm to any needed length and conversely to shorten the swing arm as needed.

10. A copyholder as defined in claim 6 wherein the first member comprises two separate parts detachably joined together back to back and set up in a horizontal direction, one of the two parts being a C-shaped channel having a pair of cylindrical openings spaced apart vertically for mounting the first member for vertical movement on uprights, the other part having detent and horizontal rail means integrally formed within a boxlike construction, the back of which serves for mounting the part stationarily on flat surfaces.

11. A desk gripper for attaching a copyboard to a desk and comprising, a right-angled bracket upon which the base plate support of the copyholder is attached, said bracket having one leg shaped to engage the top surface of the desk along the width of the desk to prevent rocking of the copyholder about a horizontally extending axis and having another leg shaped to engage the side of the desk to prevent shifting inwardly, a pair of clamp members slidably associated with the right-angled bracket and effective to grip the front and back edges of the desk at one side of the desk to prevent rocking of the copyholder about a vertical axis and also to prevent shifting of the bracket, first screw means for adjusting the position of the clamp members in opposite directions on rotation of the screw means, and vertically extending clamp means comprising an upper part attachable to the base plate, a lower part telescopingly mounted about a depending portion of the upper part and formed to engage the underside of the desk and second screw means for tightening the upper and lower parts together to thereby secure the right-angled bracket and clamp members in a position where they can perform the function of preventing rocking or shifting of the copyholder.

12. A desk gripper as defined in claim 11 including a floor support piece attached to the lower part of the vertically extending clamp means, said floor support piece having suction cups engageable with the floor for preventing any shifting of the copyholder and desk or table to which the copyholder is attached.

References Cited by the Examiner
UNITED STATES PATENTS

| | | | |
|---|---|---|---|
| 592,780 | 11/1897 | Heath | 120—28 X |
| 975,924 | 11/1910 | Aray | 281—42 X |
| 1,071,428 | 8/1913 | Jones | 120—28 X |
| 1,160,211 | 11/1915 | Swabb | 120—32 |
| 1,203,659 | 11/1916 | Smith | 120—28 |
| 1,685,041 | 9/1928 | Binkele | 120—28 |
| 1,795,857 | 3/1931 | Havenstein | 248—226.2 X |
| 2,016,941 | 10/1935 | Horwitt | 40—152.1 |
| 2,195,366 | 3/1940 | Haigh | 248—226.2 X |
| 3,100,241 | 8/1963 | Goldstein | 248—43 X |

FOREIGN PATENTS 34,813    2/1900    Great Britain.

LAWRENCE CHARLES, *Primary Examiner.*

EUGENE R. CAPOZIO, *Examiner.*